United States Patent [19]

Mummenhoff

[11] Patent Number: 5,411,010
[45] Date of Patent: May 2, 1995

[54] BASE BLADE OF FIBER-REINFORCED PLASTIC FOR CIRCULAR SAW BLADES AND/OR ABRASIVE CUTTING DISKS

[76] Inventor: Heinrich Mummenhoff, Am Hagen 20, D-42855 Remscheid, Germany

[21] Appl. No.: 175,157
[22] Filed: Dec. 29, 1993

[30] Foreign Application Priority Data

Dec. 30, 1992 [DE] Germany .......................... 42 44 476.4

[51] Int. Cl.⁶ .......................... B28D 1/12; B24D 5/04; B24D 5/10
[52] U.S. Cl. ...................................... 125/15; 451/546; 451/542
[58] Field of Search ............. 125/15; 51/206.4, 206.5, 51/206 NF, 206 R, 207, 209 R

[56] References Cited

U.S. PATENT DOCUMENTS

| | | |
|---|---|---|
| 1,865,523 | 7/1932 | Jeppson et al. |
| 2,475,517 | 7/1949 | Reis et al. .................. 51/206 NF |
| 3,023,551 | 3/1962 | Osenburg ...................... 125/15 |
| 3,315,418 | 4/1967 | Zawodni et al. .............. 451/541 |
| 3,400,497 | 9/1968 | Shoemaker ................... 51/209 R |
| 3,477,180 | 11/1969 | Robertson, Jr. ............. 51/209 R |
| 3,545,505 | 12/1970 | DeWesse et al. ............. 143/32 |
| 3,619,152 | 11/1971 | Yalof et al. .................... 125/15 |
| 3,685,215 | 8/1972 | Bates ............................ 451/546 |
| 3,716,950 | 2/1973 | McClure ....................... 451/546 |
| 4,962,748 | 10/1990 | Schweickhardt ............ 51/204 |
| 5,249,566 | 10/1993 | Sawluk ......................... 125/15 |

FOREIGN PATENT DOCUMENTS

| | | | |
|---|---|---|---|
| 0356923 | 8/1989 | European Pat. Off. . | |
| 769155 | 8/1934 | France . | |
| 0950454 | 9/1949 | France ................ | 451/544 |
| 2740891 | 3/1980 | Germany . | |
| 3137894 | 6/1982 | Germany . | |
| 3904703 | 8/1990 | Germany . | |
| 1284813 | 1/1987 | U.S.S.R. .............. | 451/546 |

Primary Examiner—Robert A. Rose
Attorney, Agent, or Firm—Jones & Askew

[57] ABSTRACT

A base blade for circular saw blades or abrasive cutting disks, comprising of a circular disk body fabricated at least partially of plastic material reinforced with embedded fibers. The fibers are arranged in many fiber layers laying upon one another which are connected without gaps, are plane, circular-disk shaped, and concentric to the disk body. In a first type of fiber layer, the fibers are arranged with respect to the body of the disk in an at least approximately radial direction in straight lines, and are arranged in a uniform distribution along the entire extent. In a second type of fiber layer, the fibers run essentially concentrically to the disk body in an at least approximately circular manner. The two types of fiber layers are arranged in the disk body in a distribution chosen as a function of the size of the disk body.

16 Claims, 6 Drawing Sheets

BASE BLADE OF FIBER-REINFORCED PLASTIC FOR CIRCULAR SAW BLADES AND/OR ABRASIVE CUTTING DISKS

The present invention pertains to a base blade for circular saw blades and/or abrasive cutting disks consisting of a circular disk body that at least partly consists of plastic material reinforced with embedded fibers.

In circular saw blades or abrasive cutting disks intended for working of stone onto which peripheral diamond cutting elements (cutting segments) are usually attached at the exterior circumference of the base blade, for certain applications, very large base blades with blade diameters of up to 5.00 m are required. In order that the weight of the base blade of such large blade diameters does not become excessive, attempts have already been made to produce the disk body from a plastic material instead of metal.

Thus, from DE-U-88 11 470 (or the publications DE-A-38 30 810 and EP-A-0 356 923 corresponding to this), a saw blade consisting of a fiber-reinforced plastic is known, wherein however, the fiber materials are embedded in the form of woven mats, and specifically, in the form of circular-sector-shaped fiber mats which are arranged symmetrical to the rotation and which overlap with the radial edge sections.

From DE-C-27 40 891, a circumferential grinding disk is known consisting of an interior hub part and an exterior rim part supporting a grinding cap of abrasives, wherein the hub and the rim are connected with one another via pre-tensed wires, fibers, or threads which thereby fulfill the function of "spokes". In this, the "spokes" are embedded in plastic. In addition to the "spokes" conventional fiber reinforcement formed of woven mats is said to be embedded in the plastic.

DE-A-2 045 814 describes a saw blade of synthetic resin which contains radial strips of boron epoxide with a relative width of 7.5 cm. Each strip in turn contains fibers of boron running in the lengthwise direction of the strip and which therefore are parallel to one another. The individual strips run cross-wise and radially through the center of the blade in each case. However, the boron threads in this primarily serve to create a cutting effect in that they end at the exterior circumference of the blade and thus act as "cutting or grinding cover".

Now, it has been shown in practice that the plastic base blades known heretofore are very unstable or delicate and twist during operation due to rotation-dependent force application and by heating due to material stresses. This leads to poor operational properties and also to poor working quality during the use of the saw blades or abrasive cutting disks. In severe cases, the twisting that occurs can even lead to the destruction of the blade and/or damage of the respective piece being worked upon. This problem could not be satisfactorily solved to date, so that plastic base blades have not yet prevailed in all areas of application.

It is therefore the object of the present invention to eliminate the problems described and, starting from the indicated state of the art, to create a base blade which assures optimal operating properties and work results under practically all operating conditions, and which also has a long useful life.

According to the invention, this is attained in that the fibers are arranged in many fiber layers lying upon one another which are connected without gaps, are plane, circular, and concentric to the body of the disks, whereby in a first type of fiber layer, the fibers are arranged with respect to the body of the disk in an at least approximately radial direction in straight lines, and in a second type of fiber layer, the fibers have an approximately circular arrangement that has an essentially concentric orientation to the body of the disk, and whereby the two types of fiber layers are arranged in the base blade in a selected distribution (sequence of stacking) which depends on the size of the body of the blade. In this, the radially arranged fibers in each case impart a high stability to the base blade in the radial direction, and the fibers arranged essentially in a circular form stabilize the blade in the circumferential direction, i.e., against bending in the radial direction, wherein a special advantage should be emphasized that the mechanical properties are virtually absolutely constant along the circumference of the base blade of the invention, because by contrast to the state of the art, "isotropy" is practically obtained within the base blade due to the fiber orientation and distribution of the invention.

It is especially advantageous if each fiber layer has a central opening so that it thereby can be formed as a circular disk, wherein the individual fiber layers of the base blade are of different size especially with respect to the ratios of their inside and outside diameters. In this, according to the invention, the distribution of these fiber layers with different diameter ratios within the base blade is also done in such a manner with regard to adjusting the dimensions (diameter, thickness) of the base blade that an optimal "stability distribution" can be obtained within the base blade of the invention.

According to the invention, although the fibers are thus arranged as accurately as possible in their respective orientation, in this, they are embedded in the plastic material of the base blade essentially free of tensile stresses. The radial fibers terminate "blindly" on both ends, i.e., they are not especially anchored or "attached" at the ends, aside from the termination of the material that occurs along their entire length. The fibers that are arranged essentially in a circle can advantageously be laid out as an endless material in a spiral shape in the corresponding layers so that their arrangement deviates very slightly from the ideal circular form, which causes no detriment however.

According to the invention, the fibers are arranged next to one another so closely in each fiber layer that a high fiber density is attained. In this, the volume proportion of the fiber of the fiber material is approximately 60–70 vol %.

In principle, any desired fiber material could be used, for example glass fibers as well. However, it has been shown to be especially advantageous to use a carbon fiber material, wherein compared to high strength (HT) carbon fibers, the so-called "high rigidity" (HM=high modulus) carbon fibers are best suited since an especially advantageous elasticity modulus can be attained with these. Due to this, the elastic properties of the base blade of the invention are even better than those of a base blade of steel.

The base blade of the invention is characterized by optimal rotation properties under nearly all operating conditions, by a low weight, as well as by a long useful life (durability).

Additional advantageous characteristics of embodiments of the invention are contained in the following description.

The invention will be described in more detail below based on the drawings, wherein.

In the various figures of the drawing, identical parts are given the same reference numbers and are therefore generally only described once. Thus, each description, that possibly only occurs once, of a part also pertains to the other figures of the drawing by analogy, in which this part can also be recognized by the corresponding reference numbers.

Figure 1:
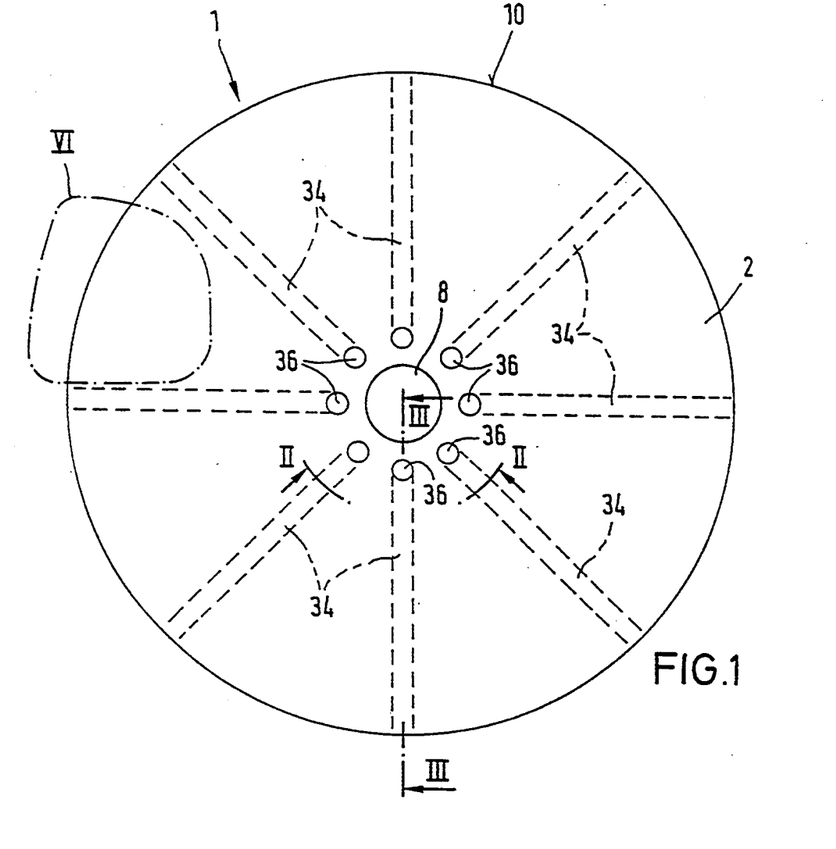
FIG. 1 is a top view of a base blade of the invention

FIG. 1 shows a base blade 1 of the invention in a simplified form, i.e., without the circumferential cutting elements. The base blade 1 consists of a circular disk body 2 that in turn consists at least in part, however primarily, of a plastic material 6 reinforced with embedded fibers 4; cf. FIGS. 2 and 3. The disk body 2 advantageously has a central opening for mounting 8. On the circumference 10 of the disk body 2, cutting elements 14 can be attached via a holder arrangement 12 which will be described in more detail below in FIGS. 6 to 10.

Figure 2:
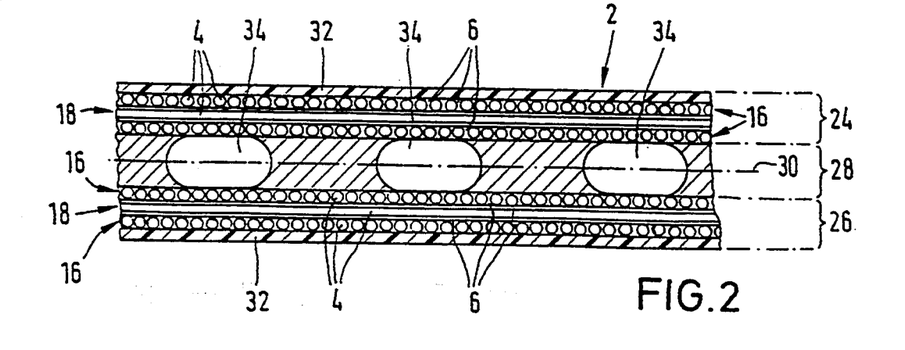
FIG. 2 is an enlarged (compared to FIG. 1), strongly schematicized section through the base blade of the invention along arc-shaped and concentrically running line II—II of FIG. 1.
Figure 3:
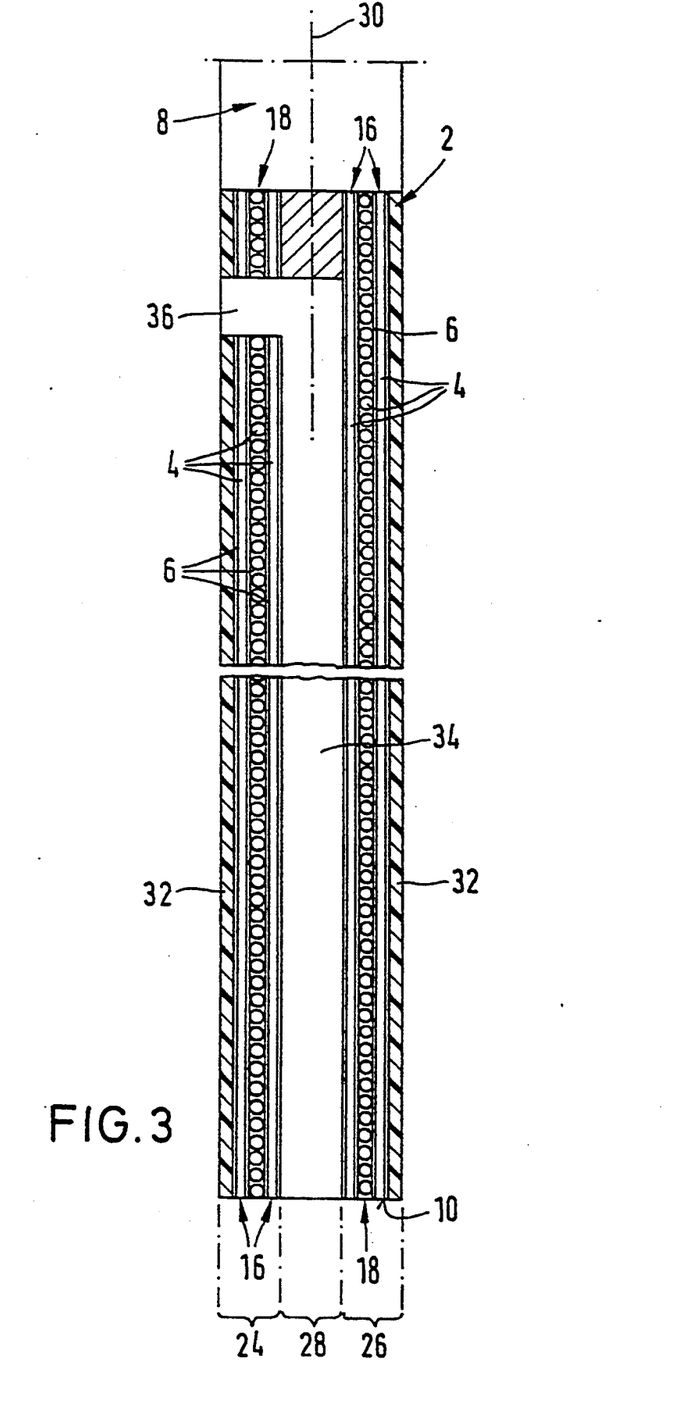
FIG. 3 As a likewise strongly schematicized radial section along line III—III in FIG. 1
Figure 4A:
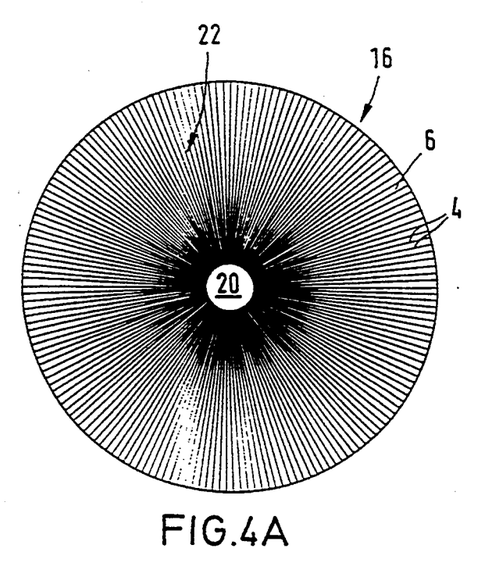
FIGS. 4A to 4D are examples different fiber layers with a radial orientation of the fibers
Figure 4B:
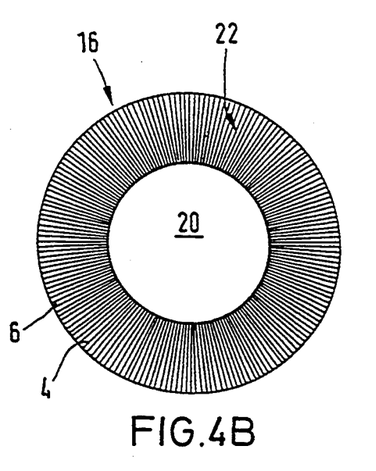
Figure 4C:
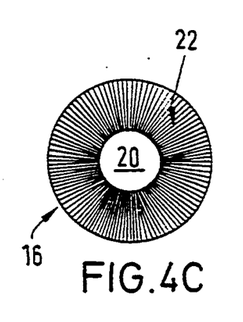
Figure 4D:
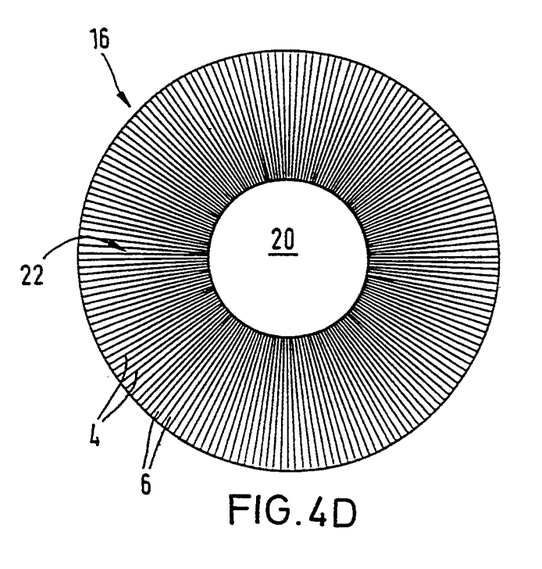

As can be seen from FIGS. 2 and 3, according to the invention, the fibers 4 are arranged in many fiber layers 16,18 that lie upon one another and are connected substantially without gaps, are plane, circular disk-shaped, and concentric to the disk body 2. In this, there are principally two different types of fiber layers present, and specifically, the fibers 4 in a first type of fiber layer 16, shown for example in FIGS. 4A to 4D, are arranged in an at least approximately radial direction in straight lines with respect to the disk body 2 and in this, are also advantageously arranged as lying as closely together as possible in a uniform distribution along the circumference of the disk. In a second type of fiber layer 18, cf. FIG. 5, the fibers 4 have an essentially concentric arrangement that is at least approximately circular to the disk body 2, wherein here too, they lie together as tightly as possible and are distributed uniformly in the radial direction (more uniformly than it perhaps appears in FIG. 5). In this, according to the invention, these two types of fiber layers 16,18 are arranged in the disk body 2 as a function of the dimensions (diameter and thickness) of the disk body 2, i.e., as a function of the "stabilization distribution" required by these dimensions, with a certain number required by the thickness and a certain distribution (stacking sequence; "combinations" of the two types of layers 16,18). For reasons of clarity, only a few fiber layers 16,18 are shown in FIGS. 2 and 3; in actuality, the disk body 2 consists of very many more (a multitude) of layers 16,18, whereby the layers 16 with the radially arranged fibers 4 preferably numerically predominate.

Figure 5:
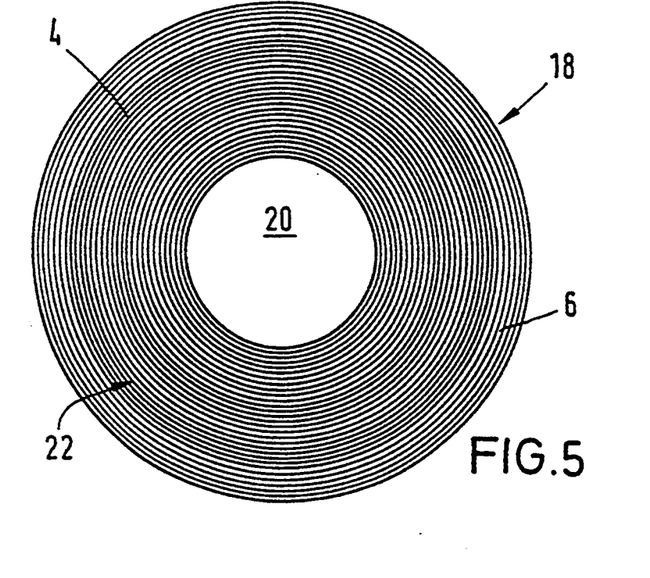
FIG. 5 is an example of a fiber layer with fibers running essentially in a circle
Figure 6:
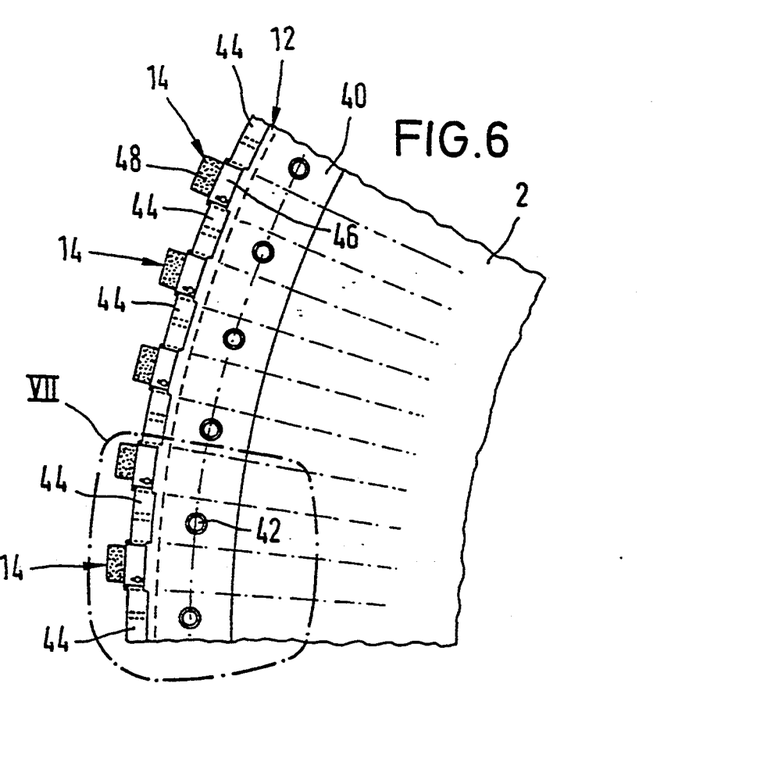
FIG. 6 is a detailed representation of an area designated VI in FIG. 1 and which is enlarged compared to FIG. 1 of the exterior circumference of the base blade of the invention
Figure 7:
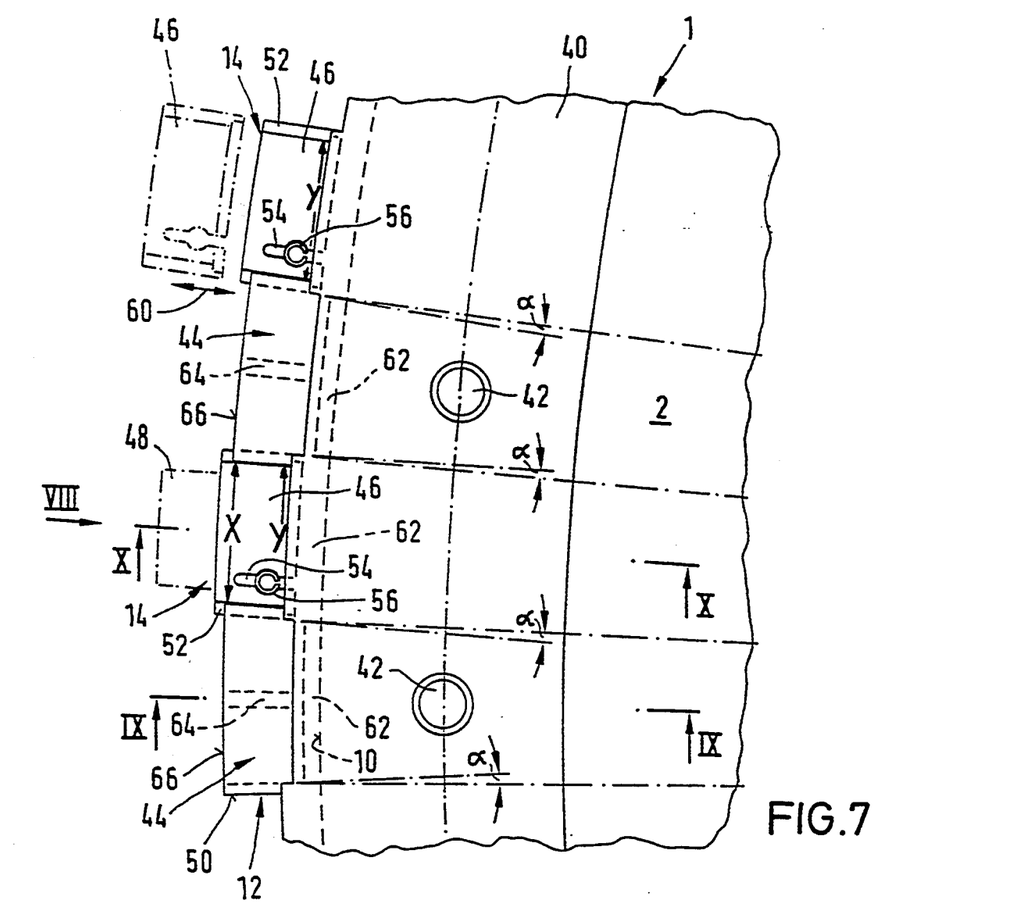
FIG. 7 is an enlarged representation of the area VII in FIG. 6.
Figure 8:
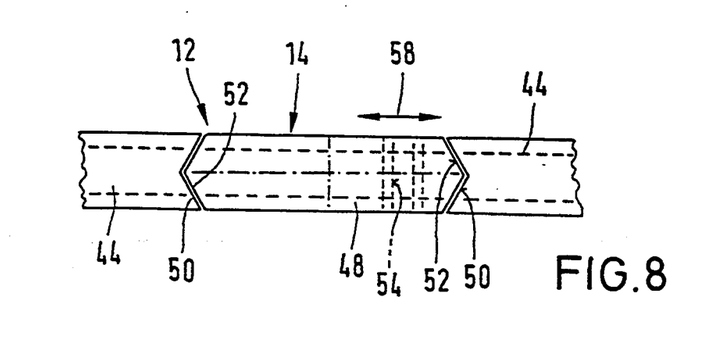
FIG. 8 is a front view of the exterior circumference of the base blade in the direction of the plane of the blade in the direction of the arrow VIII in FIG. 7

As can further be seen from FIGS. 4A to 4D as well as FIG. 5, each fiber layer 16,18 has a central opening 20 and is thus formed as a circular disk. In this, according to the invention, it is now the intent to form the individual fiber layers 16,18 differently with respect to their inside and/or outside diameters, i.e., with respect to the diameter ratios (inside diameter to outside diameter) from layer to layer. This can be seen well in FIGS. 4A to 4D. The disk body 2 is formed of from fiber layers 16,18 which differ in the type of fiber orientation and/or diameter ratio, whereby these layers are layered one upon the other in an optimal distribution with regard to stabilization for the respective dimensions of the disk body 2 and are uniformly bonded (embedded) into synthetic resin material.

For producing the disk body 2, it is especially advantageous if the individual fiber layers 16,18 are pre-manufactured from films 22 (FIGS. 4A to 4D and 5) in each case, whereby the fibers 4 are initially arranged on a support layer (which cannot be seen in the drawing), are pre-fixed, and subsequently glued with a synthetic resin. After hardening of the synthetic resin, individual films 22 are formed which can be handled easily for stacking in further processing of the disk body 2.

In this connection, it should be noted that the individual fiber layers 16,18 can also easily be recognized in the finished disk body 2, i.e., in a section through this disk body 2, since one of the support layers is especially arranged between the layers in each case. In this, support netting can preferably be considered since this fosters a connection between the layers without gaps because it can be penetrated by the plastic material without difficulty.

In an especially advantageous embodiment of the base blade of the invention 1 shown in FIGS. 2 and 3, the disk body 2 consists of three parallel layers, and specifically, of two outer layers 24 and 26 formed from the fiber layers 16,18 as well as a middle layer 28 arranged between these. The middle layer 28 could also be formed of fiber layers, somewhat analogous to the outer layers 24,26, but in a preferred embodiment example of the invention, the middle layer 28 consists of individual filler pieces that are especially pre-manufactured of fiber-reinforced plastic and/or of another fiber material, especially plastic reinforced with fiber non-wovens. This fiber non-woven then preferably consists of HM carbon fibers. In the case of the pre-manufactured filler pieces, these are preferably reinforced with HF carbon fibers, wherein these fibers then run in the same direction within the filler pieces; these are so-called "unidirectional layers".

In the preferred three-layered structure of the disk body 2, the two outer layers 24,26 are structured as mirror images of one another in the structure and arrangement of the individual fiber layers 16,18 with respect to the middle plane 30 of the disk body 2. In FIGS. 2 and 3, an attempt was made to also clarify this characteristic.

As can also be seen from FIGS. 2 and 3, the disk body 2 preferably has a wear-protection cover 32 on its two opposite surfaces in each case which are especially formed in each case of a polyester fabric. The fibers 4, which in principle are somewhat sensitive to friction and wear are protected against wear by these surficial wear-protection covers 32. For these covers 32, a material is preferably used as it is well-known under the trade name of "Diolen".

In an additional embodiment of the invention, the disk body 2 has channels 34 for a cooling medium in the area of its middle plane 30, wherein these channels 34 run from the inside of the surface area of the disk body 2 to its outer circumference 10 through the middle layer 28. In its interior surface area, the disk body 2 has inlet openings 36 (cf. FIGS. 1 and 3) which extend in the axial direction in each case to an outer layer 24 up to the middle layer 28 and terminate there into one of the channels 34 in each case. The channels 34 run preferably radially and terminate free to the outside at the outside circumference 10 of the disk body 2. The base blade 1 of the invention is mounted onto a suitable tensing flange that is not shown with a central mounting opening 8, whereby this tensing flange then also serves to introduce a cooling medium, which is introduced into the inlet openings 36 and thus into the channels 34.

A preferred embodiment of the holder arrangement 12 that is already mentioned above for especially a removable holder for the cutting element 14 will be described based on FIGS. 6 through 10.

Preferably, a single or multi-part holding ring 40 is attached in the outside circumferential area of the disk body 2 on each of its two sides. These two holding rings 40 lie in parallel planes, and the exterior circumference of the disk body 2 is arranged in areas between these holding rings 40. In a preferred example embodiment, each holding ring 40 is recessed into a ring cut-out in the disk body 2 (cf. especially FIGS. 9 and 10) so that the outer surfaces of the disk body 2 and the holding rings 40 lie in a single plane throughout in each case. The fastening of the holding rings 40 to the disk body 2 is preferably done via riveting, wherein, according to FIG. 9, rivets 42 extend through aligned drill holes of the holding rings 40 and the disk body 2. The rivets 42 are preferably formed as recessed-head rivets and consist especially of copper. By contrast, the holding rings 40 preferably consist of steel. The holding rings 40 protrude to the outside beyond the outside circumference 10 of the disk body 2 in the radial direction, at least slightly. Now, according to the invention, at the outside circumference of the holding rings 40, segment holding elements 44 are attached, and specifically, in an arrangement wherein they are uniformly distributed and equally spaced from one another along the circumference; cf. especially FIGS. 6 and 7. Preferably, the segment holding elements 44 are welded to the holding rings 40. Thus, peripheral cut-outs are formed between the segment holding elements 44 in each case which serve to accept the foot part 46 of the cutting element 14, and specifically according to the invention, the cutting elements 14 can be attached in each case between the segment holding elements 44 in the circumferential direction via a clamping connection giving the effect of a tight fit. For this purpose, each cutting element 14 consists of a foot 46 and a cutting cover 48 that is soldered on, preferably diamond-studded, and attached to this. The segment holding elements 44 and the feet 46 of the cutting element 14 are meshed in each case according to the invention via special prism-shaped guide surfaces 50,52. In the preferred example of an embodiment shown, the guide surfaces 50 of the segment holding elements 44 are formed as a prismatic groove with an essentially V-shaped groove cross-section, while the guide surfaces 52 on the feet 46 of the cutting element 14 are formed as corresponding prismatic protrusions with a suitable triangular-shaped cross-section. However, this can also be done in reverse without difficulty. Now, in this, it is the intent of the invention that the guide surfaces 50 of every segment holding element 44 run diagonally in the radial direction at an acute angle α to the respective radius, which in the example described is approximately 3° so that each cut-out intended for the foot 46 of the cutting element 14 is at least slightly narrowed from the inside to the outside in its clearance when measuring the radial width in the direction of the circumference, that is, the outside width X is smaller than the inside width Y (cf. FIG. 7). In this, the foot 46 of each cutting element 14 is shaped so that it can be spread apart in its radial inside region that is facing the holding ring 40 in the direction of the circumference so that after insertion into the cut-out in the radial direction from the outside to the inside, the guide surfaces 52 of the foot 46 can be brought to give a tight fit with the guide surface 50 of the segment holding element 44 between any two segment holding elements 44. Due to the angular position of the guide surfaces 50,52 already described, a tight fit for secure holding of the cutting element 14 is attained. To assure the ability of the feet 46 to be spread open, these each have a radial slit 54 which runs in the radial direction from the inside to the outside in the foot 46. Each slit has a preferably circular widening into which a spreading element, especially a tensing sleeve 56 can be pushed perpendicular to the plane of the disk. This causes the spreading of the feet 46; cf. the double arrow 58 in FIG. 8. Thus, according to the invention, a removable or exchangeable holder for the cutting elements 14 is provided, which can therefore be mounted or removed in the direction of the double arrow 60 shown in FIG. 7.

Figure 9:
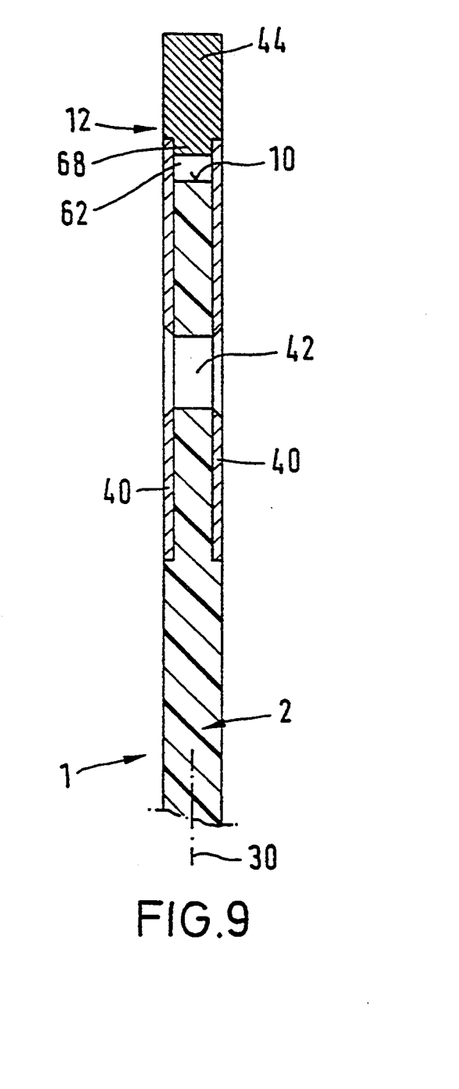
FIG. 9 is a radial section along line IX—IX in FIG. 7.
Figure 10:
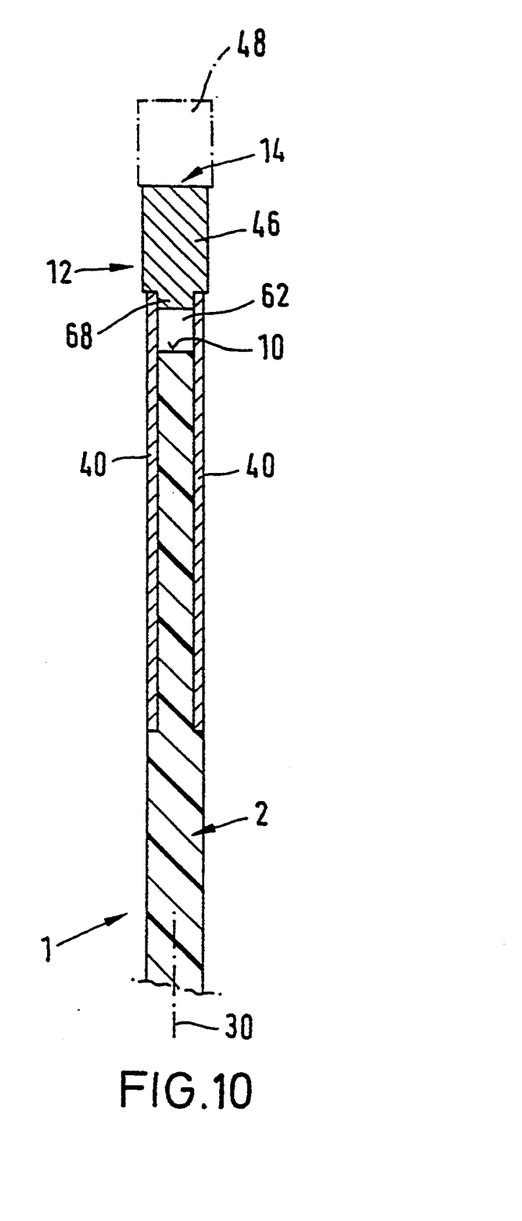
FIG. 10 is a radial section along line X—X in FIG. 7.

As is shown especially in FIGS. 9 and 10, the holding rings 40 protrude beyond disk body 2 radially towards the outside. Moreover, the interior surface areas of the segment holding elements 44 and the feet 46 of the cutting elements 14 also have spacing radially from the outside circumference 10 of the disk body 2. In this manner, according to the invention, a channel 62 is formed running in the direction of the circumference between the holding ring 40 on the one hand as well as between the outside circumference 10 of the disk body 2 and the segment holding and cutting element on the other hand. The channels 34 of disk body 2 already mentioned above terminate into this circumferential channel 62 on the one hand, and on the other hand, penetrating opening 64 of the segment holding element 44 leads from this circumferential channel 62 to the outer circumference surfaces 66. The cooling medium introduced via channel 34 of the disk body 2 can thus exit at the outside circumference, i.e., in the region of the segment holding elements 44.

Finally, in FIGS. 9 and 10, it can be seen that each segment holer 44 and preferably also every cutting element 14 or its foot 46 grips into the two holding rings 40 in a tight fit with a foot protrusion 68 and thus lies on the outside circumference of the holding rings 50 with the shoulders contacting the foot protrusion 68.

In conclusion, the process for producing the base blade 1 of the invention will be described briefly.

Initially, the fiber layer 16,18 or the films 22 are pre-manufactured with the fiber arrangement desired in each case and with certain inside/outside diameter ratios. For this purpose, the fibers 4 are preferably laid out as a thread-like endless material, especially on a support layer. In the case of the fiber layers 16, the fibers 4 are suitably wound around a number of fixed elements in such a manner that they run in a straight line in the radial direction in one plane in the area of the fiber layers 16 that are to be formed, and thus are arranged radially. In the case of fiber layers 18, the fiber material is preferably laid out spirally using a layout compass, wherein however, a nearly circular arrangement can be attained by a dense layout. The fibers 4 thus laid out are glued with a plastic binder, especially a synthetic resin, in that they are painted with this synthetic resin. After hardening of this plastic, a continuous film 22 is formed which is "cut free" in the desired sizes; in the case of the radial fibers 4, these are separated off in the inside and outside circumferential area of the circular-ring-disk-shaped film 22. The fibers 4 therefore lie substantially without tensile stresses but are arranged exactly in the respective orientation in film 22 or in the respective fiber layer 16,18. The support layer, especially relatively coarse-meshed support netting, preferably remains a component of film 22. The support netting is preferably originally arranged on a support material consisting especially of paper; however, this support material is then preferably removed from film 22 so that only the support netting remains as a component of film 22.

The disk body 2 is then formed with the thus-premanufactured fiber films 22 in that a number of especially different films 22 are layered upon one another and bonded with a uniform plastic, especially with the same synthetic resin that was also used to form films 22. In this, according to the invention, the distribution of the films 22 is done as a function of the dimensions of the disk body to be produced in such a manner that an optimal stabilization distribution for the respective dimensions is obtained in the disk body 2. In the preferred three-layered structure of the disk body 2, initially one of the outer layers 24,26 is formed by layering of appropriate fiber layers 16,18. Subsequently, the middle layer 28 is formed in that, e.g., appropriate filler elements or filler materials are applied. In this, the channels 34 are also preferably created, for which appropriate hollow spaces must be left free, or, for example, a material that can later be removed by melting out is applied. Finally, the other outside layer is applied, for which fiber layers 16,18 are laid out mirror-symmetrically to the first outside layer, i.e., in the opposite sequence.

During laying out of the fiber layers 16,18, the recesses for the holding rings 40 in the holding arrangement 12 can be molded directly. Alternatively, the holder recesses can also be formed subsequently by mechanical machining, for example.

All individual layers and plies are bonded with a uniform material of synthetic resin. The disk body 2 that has been completely laid out is then advantageously pressed and tempered during hardening.

Finally, the holder arrangement 12 for the cutting elements 14 is mounted, for which a specific description would appear not to be necessary.

It should be understood that the foregoing description relates only to preferred embodiments of the invention and that numerous changes and modifications can be made without departing from the spirit and scope of the invention as defined in the following claims.

I claim:

1. Base blade (1) for material working elements, said base blade (1) having a circular disk body (2) comprised at least partially of a plastic material (6) reinforced with embedded fibers (4), said fibers (4) being arranged in a plurality of fiber layers (16,18) lying stacked upon one another and being plane, circular-disk shaped, and concentric to said disk body (2), whereby in a first type of fiber layer (16) the fibers (4) are arranged only straight-lined and in an at least approximately radial direction with respect to the disk body (2) and are arranged in an even distribution along the entire circumference of the disk body (2), and in a second type of fiber layer (18) the fibers (4) only run essentially concentrically to the disk body (2) in an at least approximately circular manner; whereby said two different types of fiber layers (16,18) are stacked in said disk body (2) in a selected predetermined sequence of stacking as a function of the size of the disk body such that an optimal stability distribution can be obtained within the disk body (2); and whereby said fibers (4) are arranged next to one another so closely, that in the area of said fiber layers (16,18), a high fiber density with a volume proportion of approximately 60 to 70 vol % is attained.

2. Base blade as in claim 1, characterized by the fact that the fiber layers (16, 18) are formed in a circular-ting-disk shape in each case with certain inside/outside diameter ratios that are different, from layer to layer, wherein the fiber layers (16, 18) which are different in the ratio of their diameters are arranged in a certain layer distribution within the disk body (2) as a function of the size of the disk body (2).

3. Base blade as in claim 1, characterized by the fact that the fibers (4) in each fiber layer (16, 18) are arranged tightly next to one another in a uniform distribution in the plane of the layer.

4. Base blade as in claim 1, characterized by the fact that each fiber layer (16, 18) is formed by a premanufactured film (22), wherein the fibers (4) are arranged embedded in a plastic material (6) in this film (22) and wherein a number of films (22) are tightly bonded together in a certain combination one above the other.

5. Base blade as in claim 1, characterized by the fact that the fibers (4) in each fiber layer (16, 18) are arranged to lie on a support layer 6. Base blade as in claim 1, characterized by the fact that the disk body (2) consists of two exterior outer layers (24, 26) formed by the fibers layers (16, 18) in each case and a middle layer (28) lying between them.

7. Base blade as in claim 6, characterized by the fact that the middle layer (28) consists of individual premanufactured filler pieces of fiber-reinforced plastic.

8. Base blade as in claim 6, characterized by the fact that the two outer layers (24, 26) are structured mirror-symmetrically with respect to a middle plane (30) of the disk body (2) in regard to the form and arrangement of the individual layers (16, 18).

9. Base blade as in claim 6, characterized by the fact that the disk body (2) has channels (34) in the area of a middle plane (30) for a cooling medium, wherein the channels (34) run from the interior area of the disk body (2) to the outer circumference (10).

10. Base blade as in claim 1, characterized by the fact that the disk body (2) has a wear-protection cover (32) on both surfaces in each case which are formed of polyester fiber fabric.

11. Base blade as in claim 9, characterized by the fact that the disk body (2) has a holder arrangement (12) for removable fastening of cutting elements (14).

12. Base blade as in claim 11, characterized by the fact that the holder arrangement includes a plurality of foot parts (46) for receiving corresponding cutting elements (14), each foot part being in a peripheral recess on side of the base blade in such a manner that a tight fit is obtained both in the radial direction of the disk body (2) as well as across the plane of the disk.

13. Base blade as in claim 12, characterized by the fact that in an outside peripheral area and on each of the two sides of the disk body (2) one of two holder rings (40) is attached, whereby segment holder elements (44), which are uniformly distributed and spaced from one another are attached at the outer periphery of the holder rings (40); and whereby the recesses, in which the foot parts (46) of the cutting elements (14) are seated, are provided between the segment holder elements (44), and in which recesses the cutting elements (14) can be fastened by means of a clamping connection that effects a locking fit.

14. Base blade as in claim 13, characterized by the fact that the segment holding elements (44) and the cutting elements (14) are interlocked via prism-shaped guide surfaces (50, 52) in each case, whereby each recess for the foot part (46) of the cutting element (14) narrows in its clearance from the inside to the outside in the radial direction measured as the width in the circumferential direction of the disk body (2), and whereby each cutting element (14) can be spread apart in the interior of the area of its foot (46) facing the holder rings (40) in the circumferential direction.

15. Base blade as in claim 13, characterized by the fact that the holder tings (40) extend radially beyond the outside circumference (10) of the disk body (2) in such a manner that a channel (62) is formed running in this area between the holder rings (40) on the one hand, and the outside circumference (10) of the disk body (2) and the segment holder and cutting elements (44, 14) on the other hand, in the circumferential direction, into which the channels (34) of the disk body (2) terminate on the one hand, and from which passage openings (64) of the segment holding elements (44) lead to the outside circumferential surfaces (66).

16. Base blade as in claim 13, characterized by the fact that each segment holder element (44) sits tightly with a corresponding foot protrusion (68) between the two holder rings (40).

* * * * *